United States Patent [19]

Biraghi et al.

[11] Patent Number: 4,573,748
[45] Date of Patent: Mar. 4, 1986

[54] CONTAINER FOR A ROTATING TRANSPARENCY PROJECTOR FIXABLE AT A SELECTED HEIGHT ON A VERTICAL GUIDE

[76] Inventors: Giuseppe Biraghi, V.le Ghisallo 16; Amedeo Clavarino, Via Brera 17; Ferdinando Roth, P.za Coriolano 9; Michele Tarquini, V.Zamagna 19, all of Milan, Italy

[21] Appl. No.: 521,416

[22] Filed: Aug. 8, 1983

[51] Int. Cl.⁴ .............................................. A47B 81/06
[52] U.S. Cl. ...................................... 312/7.2; 312/247
[58] Field of Search ................. 248/295.1, 195, 297.2; 312/7.1, 7.2, 247; 353/119

[56] References Cited

U.S. PATENT DOCUMENTS

| 268,239 | 11/1882 | Johnson | 248/125 |
| 1,898,946 | 2/1933 | Fitzgerald | 248/125 |
| 2,335,896 | 12/1943 | Anderson | 248/295.1 |
| 2,808,218 | 10/1957 | Steller | 248/295.1 |
| 3,462,110 | 8/1969 | Cheslock | 248/125 |
| 3,840,944 | 10/1974 | Gresley | 248/295.1 |
| 3,985,430 | 10/1976 | Steiner | 353/119 |

FOREIGN PATENT DOCUMENTS 2659818  10/1977  Fed. Rep. of Germany ... 248/295.1

Primary Examiner—William E. Lyddane
Assistant Examiner—Joseph Falk
Attorney, Agent, or Firm—McGlew and Tuttle

[57] ABSTRACT

A container system for a transparency projector is mounted for movement on a guide attached vertically to a wall. The container has an aperture through which projection may be carried out, and further apertures for cooling and electrical connections. The container can be attached to the guide at the required vertical position by means of a screw knob.

10 Claims, 6 Drawing Figures

CONTAINER FOR A ROTATING TRANSPARENCY PROJECTOR FIXABLE AT A SELECTED HEIGHT ON A VERTICAL GUIDE

FIELD AND BACKGROUND OF THE INVENTION

The present invention relates to a container system for a projector, in particular for a rotating transparency projector of a type which is known.

SUMMARY OF THE INVENTION

According to the invention there is provided a container system for a projector, which system comprising a container, a guide on which the container can be displaced and means for immobilizing the container at a required height.

The projector can be used in a particularly convenient manner since it is displaceable with the aid of devices fitted along the vertical guide and can be immobilized thereon at the required height.

Furthermore, the container system is distinguished by a shape during particularly functional proportions as well as a pleasing appearance.

BRIEF DESCRIPTION OF THE DRAWING

In order that the invention may be better understood, an embodiment thereof will now be described by way of example only, and with reference to the accompanying drawings in which.

DESCRIPTION OF THE PREFERRED EMBODIMENT

Figure 1:
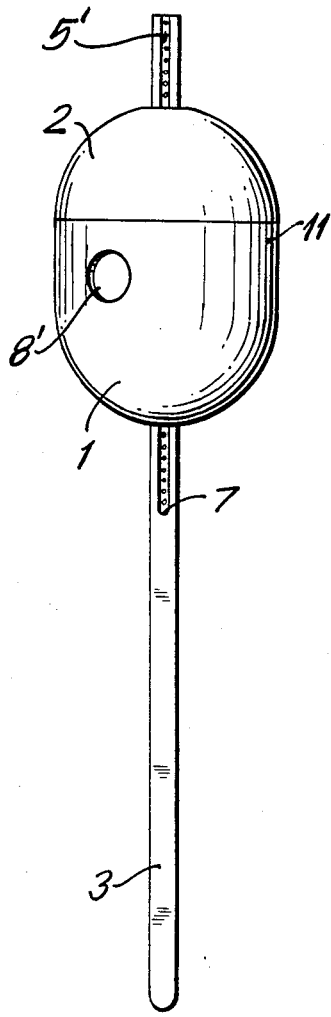
FIG. 1 is a front elevational view of an embodiment of a container system according to the invention.

Referring to the drawings, the container system consists mainly of a container proper 1, 2, which is of preferably ovoidal shape as illustrated, so that it is particularly functional and at the same time, has a pleasing appearance, and a vertical guide 3, on which the container 1, 2 can be displaced and secured at the required height by means of suitable devices.

The container itself comprises a lower hemispherical part 1 and an upper hemispherical part 2, these parts being interconnected by a preferably cylindrical part 11 which, together with parts 1 and 2 form a single assembly and which contains an orifice 8' for a projector (not shown).

The upper part 2 can be raised; this part and the cylindrical part together have three orifices 8 for cooling the container and for admitting electrical leads for supplying current to the projector, which latter can be mounted on a flat support disc 10 in the container.

Figure 4:
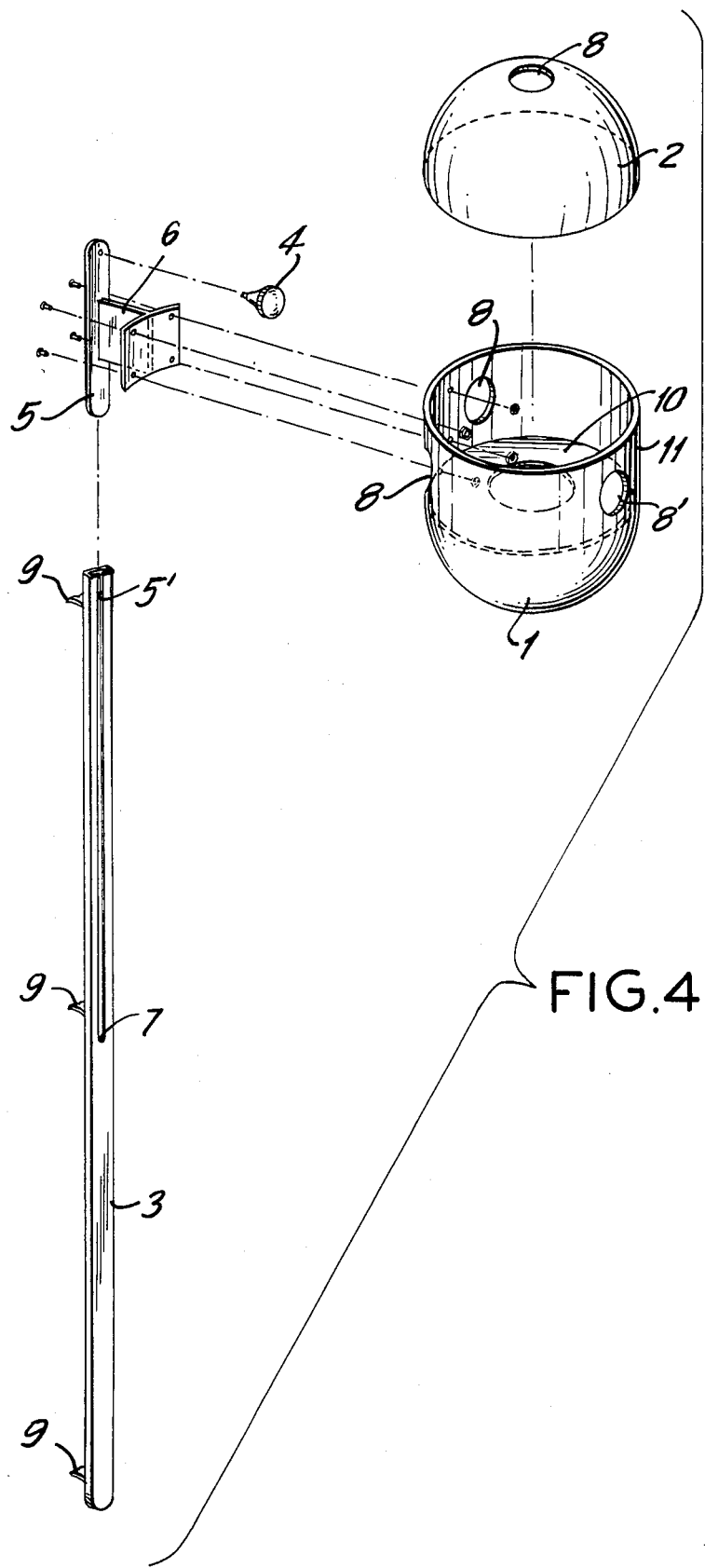
FIG. 4 is an exploded perspective view of the container system of FIG. 1.

As shown in particular in FIG. 4 in which the container system is illustrated in an exploded view, the system also comprises a vertical guide 3 which can be secured to a wall by lugs 9 or other equivalent means.

The container proper 1, 2 is secured, preferably by means of screws, to a bracket 6 and the latter is welded or soldered to a slide 5 displaceable in a C-section channel 5' provided in the guide 3. The channel 5' terminates at a certain point above the ground at 7 and advantageously contains a number of small equidistantly spaced orifices, see FIG. 1 in each of which a screw knob 4 can be selectively secured. The container 1, 2, secured to the slide 5 by means of the bracket 6 can therefore be secured, with the aid of the knob 4, at the most convenient distance from the ground depending upon the surrounding conditions and the requirements of the operator. As shown knob 4 is engaged to and through a slide 5, for this purpose.

Figure 2:
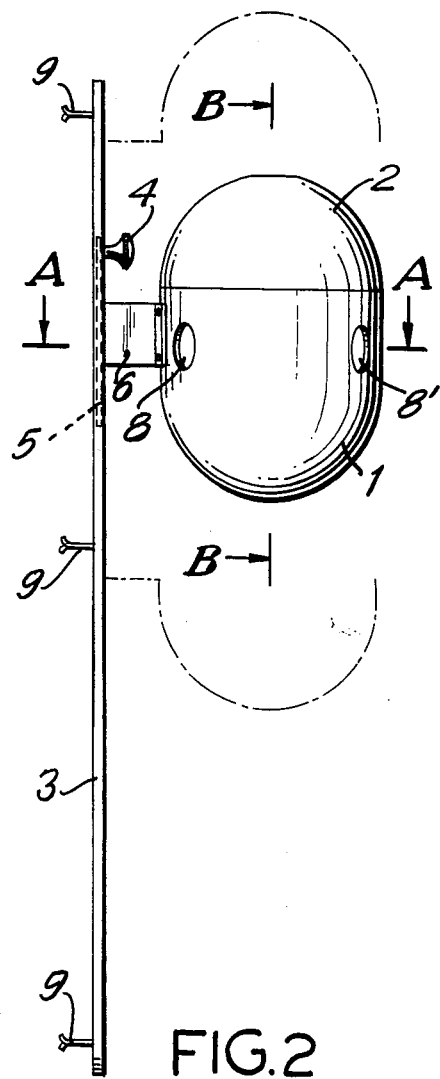
FIG. 2 is a side elevational view of the container system of FIG. 1.
Figure 6:
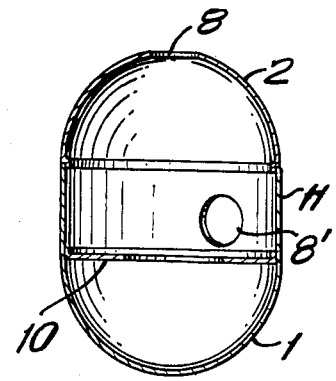
FIGS. 5 and 6 are sectional views along the lines A—A and B—B respectively of FIG. 2.
Figure 3:
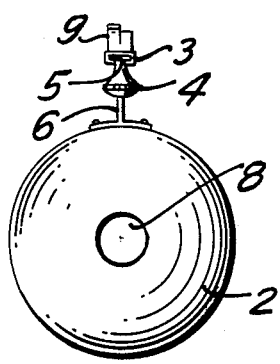
FIG. 3 is a top plan view of the container system of FIG. 1.
Figure 5:
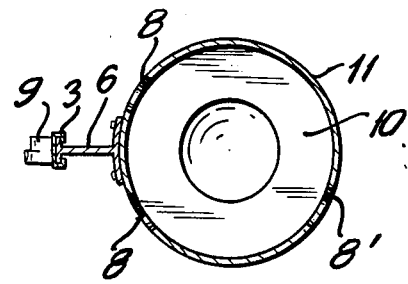

Container 1, 2 has a central vertical axis shown in FIGS. 1, 2 and 6. Vertical guide 3 lies in a common vertical plane with the central vertical axis of container 1. This plane is shown as a horizontal line in FIG. 5. It is noted that the central cylindrical portion of the container includes a plurality of horizontally extending openings, one of which is shown at 8' through which light can be projected from a projector inside the container. Another horizontal opening 8 at the rear of the container adjacent the guide 3 also extends horizontally and is for permitting access to the interior of the container. Both these horizontal openings lie at a position spaced from the vertical central plane. This offset position is chosen because a projector of the type to be seated on the platform 10 in the container would also have an offcenter lens for projection through opening 8'.

Persons familiar with the commercially available rotating transparency projectors will appreciate the particular functionability and ease of use provided by the inventive container system.

We claim:

1. A container system for a projector comprising:
   a vertical guide having a vertically extending track;
   at least one lug connected to said guide for securing said guide to a vertical wall;
   a slide slidably engaged to said track for vertical displacement with respect to said guide;
   a bracket connected to said slide;
   a container for containing a projector having a central vertical axis and having a first portion fixed to said bracket and including a lower hemispherical part and an upper cylindrical part, said container including a hemispherical top part disengageably connected to said cylindrical part for opening a top of said container, said hemispherical and cylindrical parts defining an interior space, a platform connected in said first portion of said container for supporting a projector, said cylindrical part having a plurality of horizontally extending openings therethrough, one of which is provided on the side of said cylindrical part opposite said vertical guide for permitting projecting therethrough and at least one other of said openings provided for establishing access with the interior of said container, said vertical guide and said central vertical axis lying in a common central vertical plane, said horizontally extending openings through said cylindrical part being spaced away from said central vertical plane; and
   securing means connected between said slide and said track for securing said slide, and said container, and at a selected vertical position with respect to said guide.

2. A container system according to claim 1, wherein said said guide track includes a C-cross-sectioned portion defining said track, said slide and bracket having a T-shaped configuration for sliding in said track, said securing means comprising a plurality of spaced apertures defined in said track and a knob connected to said slide and engageable with one of said apertures.

3. A container system according to claim 2, wherein said platform comprises an apertured disc positioned in the container interior at a location of connection between said lower hemispherical part and said upper cylindrical part.

4. A container system according to claim 3, wherein said track has a rounded bottom, said slide being elongated in the vertical direction and having a rounded top and a rounded bottom.

5. A container system according to claim 4, wherein said slide is welded to said bracket, said bracket having a T-shaped cross-section with a curbed part screwed to said cylindrical part of said container.

6. A container system according to claim 5, wherein said knob is a screw knob.

7. A container system according to claim 6, wherein said cylindrical part includes three circular apertures, two of said apertures being adjacent said vertical guide and on opposite sides of said bracket and the remaining one of said apertures being said aperture which is on a side of said cylindrical part opposite said vertical guide, said hemispherical top part having a circular opening at a top thereof and said apertured disc having a single central circular opening therein vertically aligned with said top opening of said top part.

8. A container system, according to claim 1, including, in combination with said container system, a projector mounted on said platform and having a lens spaced away from said central vertical plane and positioned for projecting light through said one of said horizontally extending openings.

9. A container system for a projector comprising:
a bracket for mounting on a vertical wall;
a container for containing a projector having a central vertical axis and having a first portion fixed to said bracket and including a lower hemispherical part and an upper cylindrical part, said container including a hemispherical top part disengageably connected to said cylindrical part for opening a top of said container, said hemispherical and cylindrical parts defining an interior space, a platform connected in said first portion of said container for supporting a projector, said cylindrical part having a plurality of horizontally extending openings therethrough, one of which is provided on the side of said cylindrical part opposite said vertical guide for permitting projecting therethrough and at least one other of said openings provided for establishing access with the interior of said container, said bracket and said central vertical axis of said container lying in a common central vertical plane, said horizontally extending openings all being spaced from said vertical plane; and
securing means connected between said slide and said track for securing said slide, and said container, and at a selected vertical position with respect to said guide.

10. A container system, according to claim 9, including, in combination with said container system, a projector mounted on said platform and having a lens spaced away from said central vertical plane and positioned for projecting light through said one of said horizontally extending openings.

* * * * *